Patented Sept. 6, 1932

1,875,894

UNITED STATES PATENT OFFICE

JAMES A. SINGMASTER, OF BRONXVILLE, NEW YORK

ARTIFICIAL SILK FILAMENT AND METHOD OF MAKING SAME

No Drawing.   Application filed May 8, 1929.   Serial No. 361,543.

My invention relates to improved artificial silk filament and is in effect supplemental to my invention forming the subject matter of my pending application filed September 28, 1927, Serial Number 222,685, which generally speaking consists in the method of manufacturing an artificial silk filament of a desirable opacity and covering power and diminished lustre by thoroughly incorporating and distributing in the solution from which the filament is formed by forcing it through a minute orifice, small particles of an inorganic pigment-like material the particle size of which, its distribution through the solution, and its quantity, are such as to impart the desired opacity and covering power to the produced filament without materially impairing the continuity of its mass material. The object of my present invention is to provide for the best method of carrying the general process into use and for the production of a filament of the best composition to produce an attractive artificial silk.

All processes of manufacturing artificial silk filament comprise the step of forming a soluble compound of cellulose, dissolving it in a suitable solvent, very thoroughly filtering and straining that solution to exclude matter which would tend to clog the minute apertures through which it is passed to form a filament or to impair the necessary continuity of the mass material of the filament produced, passing the solution through the minute apertures of the spinnerette and freeing the filament issuing from the spinnerette from the solvent, the filtering and straining of the solution is many times repeated and in practice the solution is finally filtered or strained just before it is passed to the spinnerettes. It is necessary therefore that the inorganic pigment particles incorporated in the solution should not only be of small particle size as compared with the area of the spinnerette but also should be capable of passing freely through the filters and strainers and preferably I mix the pigment particles with the solution before it is filtered so that they must pass through the entire filtering system and I believe that the filtration of the solution containing the pigment particles has a good effect not only in eliminating too large particles but also in bringing about a more thorough separation and distribution of the particles in the solution and consequently in the spun filament. For the most part the particle size of suitable inorganic pigments will or can be considerably less than .75 microns but I have found that particles of or slightly exceeding this size will freely pass the filters and spinnerettes and when properly distributed will not materially impair the continuity of the mass material of the finished filament.

The soluble compounds of cellulose are of such a nature that they are readily permeated by the solvent and the best way of obtaining a proper dispersion of the pigment in the solution is to thoroughly mix the pigments with a portion of the solvent preferably by grinding so that aggregations are broken up and each particle wet by the solvent. This mixture is then mixed with the remainder of the solvent and the resultant mixture then mixed in the usual way with the soluble cellulose compound. For example in the manufacture of nitrocellulose silk in which a mixture of alcohol and ether is used as the solvent I thoroughly mix the pigment with a portion of the alcohol, preferably by grinding, and then mix the resultant product with the remainder of the alcohol and ether before bringing the solvent into contact with the nitrocellulose. The solvent with the pigment in suspension is then thoroughly mixed with the nitrocellulose in preferably a rotary mixing machine in which the nitrocellulose is completely dissolved and a collodion produced in which the pigment particles are very thoroughly distributed. This thorough distribution of the pigment particles in the collodion is no doubt further promoted and aggregates of pigment particles broken up by the subsequent filtrations to which the collodion is subjected before it passes to the spinnerette.

In addition to having a sufficiently small particle size the inorganic particles used must be employed in only such relatively small proportions to the mass material as is necessary to bring about a desirable opacity, covering power and diminished lustre to the finished filament without materially impairing the continuity of its mass material and thereby weakening its strength below what is commercially permissible.

The above conditions I have found are filled by practically all otherwise available inorganic pigments. Thus for example taking the case of nitrocellulose silk, the effect produced by incorporating in a filament one-half of one percent of titanium dioxide which is the material I have found most advantageous in my improved filament substantially similar effects are produced by using the following inorganic pigment particles in the stated quantities: titanium oxide 0.5; titanalba 0.5; titanox 1.; zinc sulphide 1.; fine texture lithopone 1.5; zirconalba 3.; zirconium oxide 3.; blanc fixe 4.; alumina fume 4.; thorium oxide 3. It is true that of the above list of pigments zinc sulphide and fine texture lithopone are reactive with certain of the acids used in the manufacture of nitrocellulose filaments but the percentage of these acids present is not sufficient to bring about any appreciable reaction with these pigments and they may be considered therefore as inert pigments suitable for use. In other varieties of artificial silk the proportionate quantities of pigments which will give approximately the same standard appearance to the filaments will vary in many cases from those given with regard to nitrocellulose silk. In no case however does the incorporation of the pigments in the stated proportions or in amply sufficient amount materially impair the continuity and strength of the mass material of the filament.

In the case of cellulose acetate silk the pigments which I have found adapted for use with nitrocellulose silk can be used in approximately the same proportions given and in addition the following pigments are available in the stated proportions for standard delustration: zinc oxide, U. S. P. 10%; zinc oxide, kadox 10%; timanox 2%; sublimed white lead 4%.

Another quality or characteristic of inorganic particles available for use in my process and product is that their light refractive index should be different from that of the cellulose or cellulose product forming the mass material in which they are embedded in the filament. It is perhaps generally true that the necessary quantity of pigment to produce a standard effect in the filament will vary with the difference of their light refractive index above or below that of the mass material but this does not appear to be the case with all pigments. Barium sulphate in the form of blanc fixe for example gives better results than might be expected from the refractive index alone. This in all probability is due to air or moisture included in the pigment aggregates.

Again for the best results I have found that it is necessary to use inorganic pigments which are substantially white and remain white in the finished filament. Any material color in the incorporated pigment will impair the commercial value of the filaments. Again for the best results the inorganic pigment employed must be of such a character that it is not chemically reactive with chemicals used in the manufacture and treatment, such as bleaching and dyeing, of the filaments. This is a feature of my previously filed application but is to be had in view with the other requisites of the usable pigments which I have above described and it will be obvious to those familiar with artificial silk processes that certain pigments will be inert in certain processes and reactive in others available for instance in the manufacture of acetate silk and unavailable in making artificial silk by the nitrocellulose process.

Having now described my invention, what I claim as new and desire to secure by Letters Patent, is:

1. An artificial silk filament having immersed in and distributed throughout its mass material fine particles of titanium dioxide.

2. An artificial silk filament having the characteristic features of claim 1 in which the titanium dioxide is used in the proportion of approximately one-half of one per cent of the mass material.

JAMES A. SINGMASTER.